July 5, 1927.

F. L. MORSE

DRIVE CHAIN

Filed Feb. 21, 1924

1,634,334

WITNESS.
Gustav Genzlinger.

INVENTOR
Frank L. Morse
BY
ATTORNEYS

Patented July 5, 1927.

1,634,334

UNITED STATES PATENT OFFICE.

FRANK L. MORSE, OF ITHACA, NEW YORK, ASSIGNOR TO MORSE CHAIN COMPANY, A CORPORATION OF NEW YORK.

DRIVE CHAIN.

Application filed February 21, 1924. Serial No. 694,214.

This invention relates to sprocket chains for general driving purposes but is particularly useful where a chain of light construction easy and inexpensive to manufacture and rigid in construction is desired, such as used on bicycles and other light vehicles or devices.

It further relates to that class of chains wherein two part pintles are used for joining the links and which are in some cases provided with surrounding rollers for engaging the teeth of the sprocket.

One of the primary objects of this invention is the provision of a two part pintle both parts of which can be made from the same bar stock of a simple cross section whereby the cost of manufacture is materially reduced.

Another object of this invention is to provide means for positioning the parts of the pintle in the links in such a manner as to be thoroughly efficient and to maintain the pintle parts in place without the use of extra parts.

Various other advantages obtainable through my invention will appear from my description hereinafter of the best methods and apparatus for the purpose that are known to me.

In the drawings Fig. 1 is a side elevation of a drive chain embodying my invention.

Figure 1:
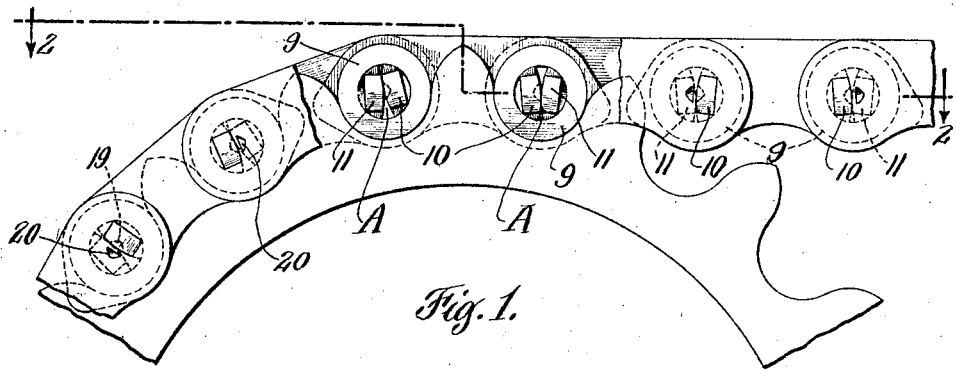

Referring now to the drawings it will be seen that the chain is very simple in construction and comprises the outside links 7, the inside links 8, the two part pintles A. and in some cases the rollers or sleeves 9 which surround the pintles A. Each pintle A is composed of a pin 10 and a pin 11.

Figure 2:
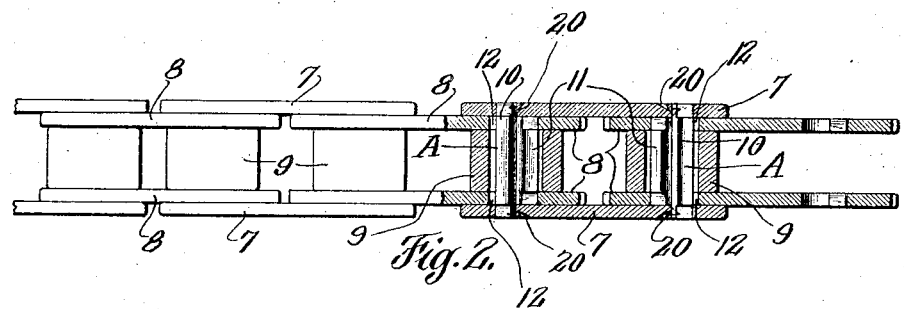
Fig. 2 is a plan section taken on the line 2—2 of Fig. 1.
Figure 3:
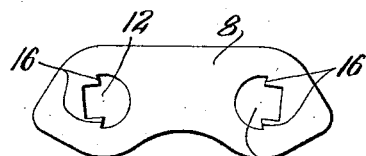
Fig. 3 is a detailed view of an inside link.
Figure 4:
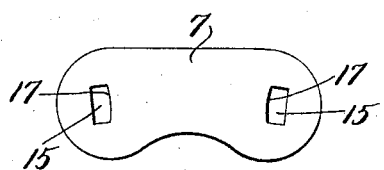
Fig. 4 is a detailed view of an outside link.
Figure 5:
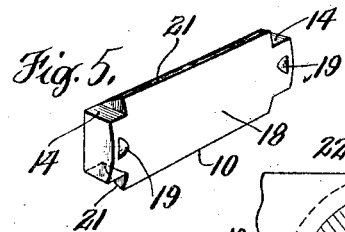
Figs. 5 and 6 are perspective views of the two pins comprising the pintle.
Figure 6:
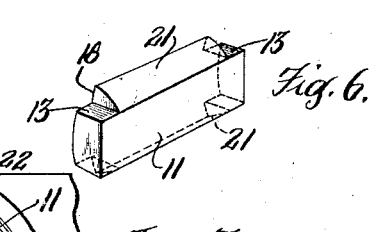

The inside links 8 have openings 12 at their ends which are semicircular toward the center of the links and rectangular toward the ends of the links. The rectangular portions of the openings are at a slight angle to a perpendicular through the center of the face of the link as seen in Fig. 3, such angle being approximately 5°. The pin 10 passes through the semicircular portion 12 in the inside link 8 while the pin 11 has a shouldered portion 13 which is positioned in the rectangular portion of the opening 12 whereby the pin is held at an angle corresponding to that of the rectangular portion of the hole. The pins 10 are also provided with shouldered portions 14 which fit snugly in the substantially rectangular openings 15 in the outside links 7 which openings 15 are also tilted at a slight angle corresponding to that of the rectangular portion of the holes in the inside links. (See Fig. 4.) The surfaces 16 of the openings 12 and the surfaces 17 of the openings 15 have a curvature corresponding to the curvature of the convex faces 18 of the members 10 and 11. The shouldered portions 14 of the pins 10 are provided with prick punches 19 into which metal from the outside links is punched as best shown at 20 in Figs. 1 and 2.

It is to be noted that by virtue of the twisting of both pins comprising the pintle, they can both be made from bar stock of the same simple cross section. These pins are so simple in design that they may be sheared and shouldered in one operation from bar stock, which is rolled or drawn to have the desired cross section.

The pins 10 connecting the outside links may have the prick punches 19 formed in the shearing and shouldering operation. The edges 21 of the pins when assembled present a cylindrical surface of a diameter allowing a running fit of the rollers.

Owing to this simple construction it will be seen that such a chain may be cheaply manufactured there being only three kinds of stock needed, namely, flat stock for the links, bar stock for the pins and tubular stock for the rollers, although the rollers could also be made as punchings.

The angle at which the pins are set, that is the approximate 5° angle, forms an important part of this invention because it is by virtue of this that I am able to make both pins forming the pintle of similar cross section and to employ the double convex surfaces.

Figure 7:
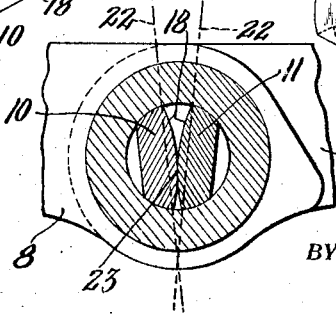
Fig. 7 is an enlarged view of a pintle joint.

Referring to Fig. 7 it will be seen that by positioning the pins 10 and 11 at the proper angle, in this case 5°, as indicated by the dotted lines 22, the curve generated by the contact point 23 as the link 8, in which the pin 11 is positioned, goes around the sprocket, will coincide with the surface 18 of the adjacent pin 10.

The assembling of a chain constructed in accordance with my invention is very simple and it will be seen that the longer pins act as spacers for the outside links and the shorter ones as spacers for the inside links, the shoulders on the longer pins giving proper clearance between the inside and outside links, while the shoulders on the shorter pins give proper clearance to the rollers.

I claim:

1. A drive chain comprising inside and outside links, two part pintles joining the links, one part of each pintle being shouldered to space the inside links and the other part of each pintle being shouldered to space the outside links, and a roller surrounding each pintle.

2. A drive chain comprising inside and outside links, two part pintles joining the links, each part being of similar cross section but one part being of less length than the other and each part having shoulders at their ends whereby the inside links are spaced by one part of the pintles and the outside links by the other part and a roller surrounding each pintle.

In testimony whereof I have hereunto signed my name.

FRANK L. MORSE.